US012789446B2

(12) United States Patent
Kim et al.

(10) Patent No.: US 12,789,446 B2
(45) Date of Patent: Nov. 10, 2026

(54) APPARATUS FOR ATTACHING PROTECTIVE FILM

(71) Applicant: SAMSUNG ELECTRONICS CO., LTD., Suwon-si (KR)

(72) Inventors: Kiwoong Kim, Suwon-si (KR); Seunggoo Hwang, Suwon-si (KR); Jong In Do, Gumi-si (KR); Ook Jin Lee, Gumi-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 19/018,866

(22) Filed: Jan. 13, 2025

(65) Prior Publication Data

US 2025/0144869 A1 May 8, 2025

Related U.S. Application Data

(63) Continuation of application No. PCT/KR2023/008506, filed on Jun. 20, 2023.

(30) Foreign Application Priority Data

Jul. 22, 2022 (KR) ........................ 10-2022-0091053
Aug. 3, 2022 (KR) ........................ 10-2022-0096693

(51) Int. Cl.
*B29C 63/00* (2006.01)
*B29C 63/02* (2006.01)

(52) U.S. Cl.
CPC ...... *B29C 63/0004* (2013.01); *B29C 63/0047* (2013.01); *B29C 63/02* (2013.01); *B29C 2063/0008* (2013.01)

(58) Field of Classification Search
CPC . B29C 66/82; B29C 65/7841; B29C 65/7802; B29C 2063/0008; B29C 63/22;
(Continued)

(56) References Cited

U.S. PATENT DOCUMENTS 11,926,107 B2 * 3/2024 Jeong .................. B29C 63/0004
2019/0047815 A1 2/2019 Kim

FOREIGN PATENT DOCUMENTS

JP 2003-311842 A 11/2003
KR 10-2083628 B1 3/2020
(Continued)

OTHER PUBLICATIONS

Hashimoto, Translation of JP2003311842A (Year: 2003).*
Lee, Machine Translation of KR102172895B1 (Year: 2020).*
Kwak, Machine Translation of KR102015330B1 (Year: 2019).*

*Primary Examiner* — Philip C Tucker
*Assistant Examiner* — Hana C Page
(74) *Attorney, Agent, or Firm* — Sughrue Mion, PLLC

(57) ABSTRACT

An apparatus configured to attach a protective film to a surface of an electronic device includes a fixing tray including a seating portion at which the electronic device is seated, a base to which the fixing tray is coupled, the base including a rail extending in a first direction, and a roller module configured to move along the rail in the first direction, the roller module including a roller configured to press the surface of the electronic device seated in the fixing tray, where the fixing tray includes a first fixing guide protruding from the fixing tray in the first direction from the seating portion and configured to support a first end of the protective film, and a second fixing guide protruding from the fixing tray in a second direction that is opposite to the first direction and configured to support a second end of the protective film.

20 Claims, 14 Drawing Sheets

(58) Field of Classification Search
CPC ........... B29C 66/83411; B29C 66/8362; B29C 63/0047; B32B 37/0053; B32B 37/0007; B32B 37/10
See application file for complete search history.

(56) References Cited

FOREIGN PATENT DOCUMENTS

| | | | |
|---|---|---|---|
| KR | 10-2020-0085480 | A | 7/2020 |
| KR | 10-2169780 | B1 | 10/2020 |
| KR | 10-2021-0079124 | A | 6/2021 |
| KR | 10-2263407 | B1 | 6/2021 |
| KR | 10-2292224 | B1 | 8/2021 |
| KR | 10-2344317 | B1 | 12/2021 |
| KR | 10-2022-0076288 | A | 6/2022 |

* cited by examiner

APPARATUS FOR ATTACHING PROTECTIVE FILM

CROSS-REFERENCE TO RELATED APPLICATIONS

This application is a bypass continuation of International Application No. PCT/KR2023/008506, filed on Jun. 20, 2023, in the Korean Intellectual Property Receiving Office, which is based on and claims priority to Korean Patent Application No. 10-2022-0096693, filed on Aug. 3, 2022, in the Korean Intellectual Property Office, and Korean Patent Application No. 10-2022-0091053, filed on Jul. 22, 2022, in the Korean Intellectual Property Office, the disclosures of which are incorporated herein by reference in their entireties.

BACKGROUND

1. Field

The disclosure relates to an apparatus for attaching a protective film.

2. Description of Related Art

A protective film, which is attached to a surface of an attachment target, such as an electronic device, is used to prevent scratches or damage, and an apparatus for attaching protective film is a device for attaching the protective film to the surface of the electronic device.

The apparatus for attaching a protective film should attach the protective film evenly and accurately to all areas of the surface of the electronic device such that no bubbles are formed between the surface of the electronic device and the protective film, and such that the protective film is not warped.

For example, if the electronic device is a display device, the surface, to which the protective film is attached, of the electronic device may be a display surface or a protective layer or a transparent glass layer that is formed outside a display panel. If the attachment between the display surface and the protective film is poor, color may smudge or definition may deteriorate on the display surface, causing inconvenience to a user.

In addition, at least some areas of the surface of the electronic device may be curved, flexible, or bendable, which makes the attachment of the protective film to this surface more difficult.

SUMMARY

Provided is apparatus for attaching a protective film capable of reducing or eliminating the warping or bubbles of the protective film and may attach the protective film quickly and accurately.

Additional aspects will be set forth in part in the description which follows and, in part, will be apparent from the description, or may be learned by practice of the presented embodiments.

According to an aspect of the disclosure, an apparatus configured to attach a protective film to a surface of an electronic device may include a fixing tray including a seating portion at which the electronic device is seated, a base to which the fixing tray is coupled, the base including a rail extending in a first direction, and a roller module configured to move along the rail in the first direction, the roller module including a roller configured to press the surface of the electronic device seated in the fixing tray, where the fixing tray includes a first fixing guide protruding from the fixing tray in the first direction from the seating portion and configured to support a first end of the protective film, and a second fixing guide protruding from the fixing tray in a second direction that is opposite to the first direction and configured to support a second end of the protective film, and where the first fixing guide includes a guide block to which an end of the protective film is fastened, the guide block configured to be tilted about a rotation axis in response to a change in tension applied to the protective film from movement of the roller, a guide housing accommodating the guide block, and an elastic member in the guide housing and configured to provide a restoring force in the first direction in response to movement of the guide block.

The guide block may include a first end inside the guide housing and a second end that is opposite to the first end and extending in a direction away from the guide housing.

The guide block may include a head area to which the end of the protective film is fastened and a protruding area under the head area and protruding from at least a portion of a circumference of the guide block.

The guide block may include chamfering surfaces at an edge of an end of the head area.

The guide block may include a chamfering surface at an edge of an end of the head area and having a bevel shape.

The guide block may include a rounded chamfering surface at an edge of an end of the head area.

The elastic member may be between the guide block and the guide housing in the second direction.

The first fixing guide may include a plurality of elastic members extending in one direction.

The guide block may include a first accommodating groove into which a first end of the elastic member is inserted and the guide housing may include a second accommodating groove into which a second end of the elastic member that is opposite to the first end is inserted.

The first fixing guide may include a shaft member supporting the guide block such that the guide block is tilted in the first direction or the second direction.

The elastic member may surround at least a portion of a circumference of the shaft member.

The elastic member may include a first area surrounding at least a portion of a circumference of the shaft member, a second area connected to a first end of the first area and fixed to the guide block, and a third area connected to the second end of the first area that is opposite to the second area and fixed to the guide housing.

The guide housing may include a slope on an inner surface facing the guide block such that the third area of the elastic member is seated in the slope.

The first fixing guide may be configured to be tilted in a range of 15 degrees to 25 degrees in the second direction with respect to a direction perpendicular to the surface of the electronic device as the roller module moves in the first direction.

The first fixing guide may protrude to a position that is higher than a position of the second fixing guide with respect to the fixing tray.

According to an aspect of the disclosure, an apparatus configured to attach a protective film to a surface of an electronic device may include a fixing tray including a seating portion at which the electronic device is seated, a base to which the fixing tray is coupled, the base including a rail extending in a first direction, and a roller module configured to move along the rail in the first direction, the roller module including a roller configured to press the surface of the electronic device seated in the fixing tray, where the fixing tray includes a first fixing guide protruding from the fixing tray in the first direction from the seating portion and configured to support a first end of the protective film, and a second fixing guide protruding from the fixing tray in a second direction that is opposite to the first direction and configured to support a second end of the protective film, and the first fixing guide includes a guide block to which an end of the protective film is fastened, the guide block configured to be tilted about a rotation axis in response to a change in tension applied to the protective film from movement of the roller, a guide housing accommodating the guide block, and an elastic member between the guide block and the guide housing in the second direction and configured to provide a restoring force in the first direction in response to movement of the guide block.

The guide block may include a first accommodating groove into which a first end of the elastic member is inserted, and the guide housing may include a second accommodating groove into which a second end that is opposite to the first end of the elastic member is inserted.

The guide block may include a first end inside the guide housing and a second end that is opposite to the first end and that extends in a direction away from the guide housing, and the first fixing guide may be closer to the first end than the second end and may include a shaft member supporting the guide block such that the guide block is configured to tilt in the first direction or the second direction.

The guide block may include a head area to which the end of the protective film is fastened, and a protruding area under the head area and protruding from at least a portion of a circumference of the guide block.

The guide block further may include chamfering surfaces at an edge of an end of the head area.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
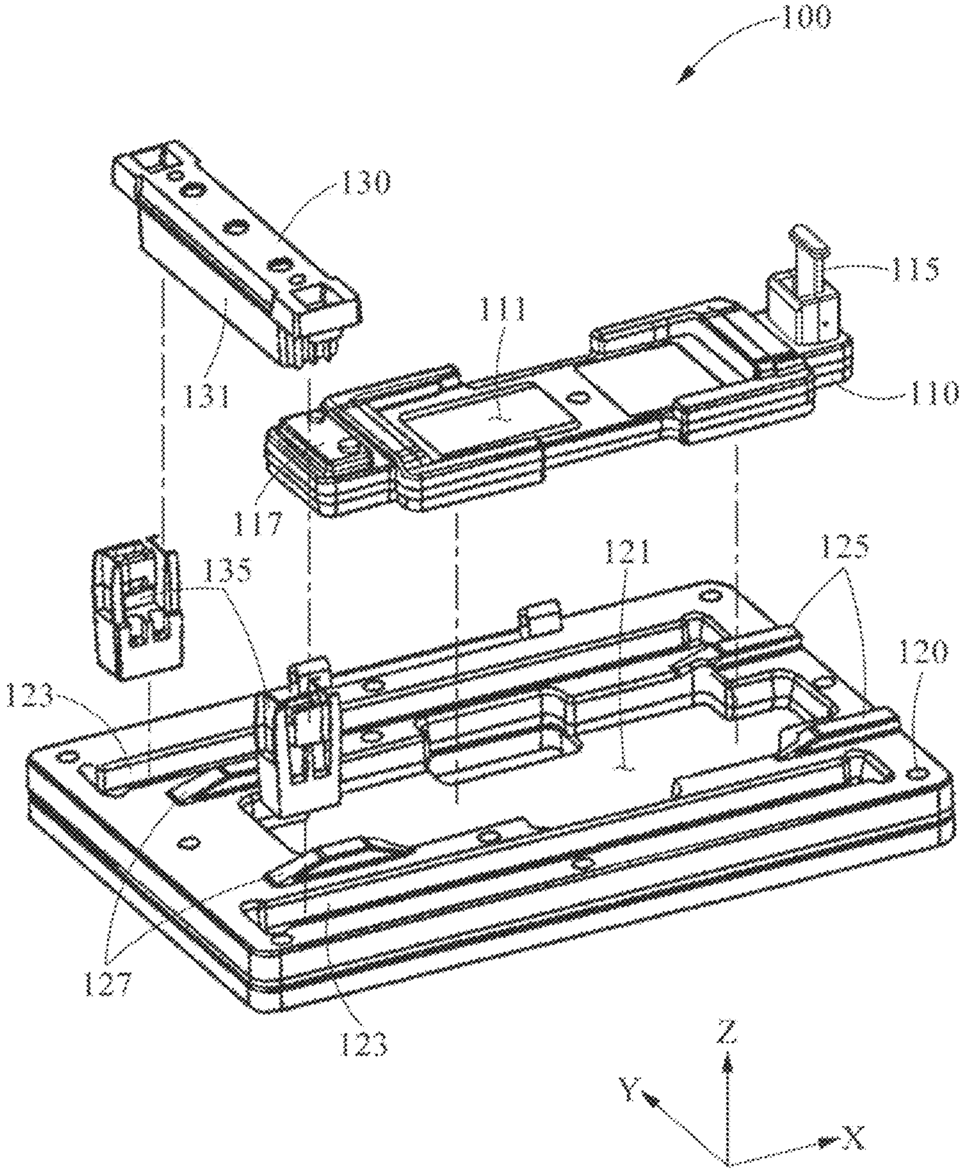
FIG. 1 is a perspective view of an apparatus for attaching a protective film according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

According to one or more embodiments, each component of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components may be integrated into a single component. In such a case, according to one or more embodiments, the integrated component may still perform one or more functions of each of the components in the same or similar manner as they are performed by a corresponding one among the components before the integration. According to one or more embodiments, operations may be carried out sequentially, in parallel, repeatedly, or heuristically, or one or more of the operations may be executed in a different order or omitted, or one or more other operations may be added.

Hereinafter, an apparatus for attaching a protective film 100, according to one or more embodiments of the present disclosure, is described with reference to FIGS. 1 to 8B.

FIG. 1 is a perspective view of the apparatus for attaching a protective film 100 according to one or more embodiments.

Referring to FIG. 1, the apparatus for attaching a protective film 100 may include a fixing tray 110, a base 120, and a roller module 130.

Figure 2:
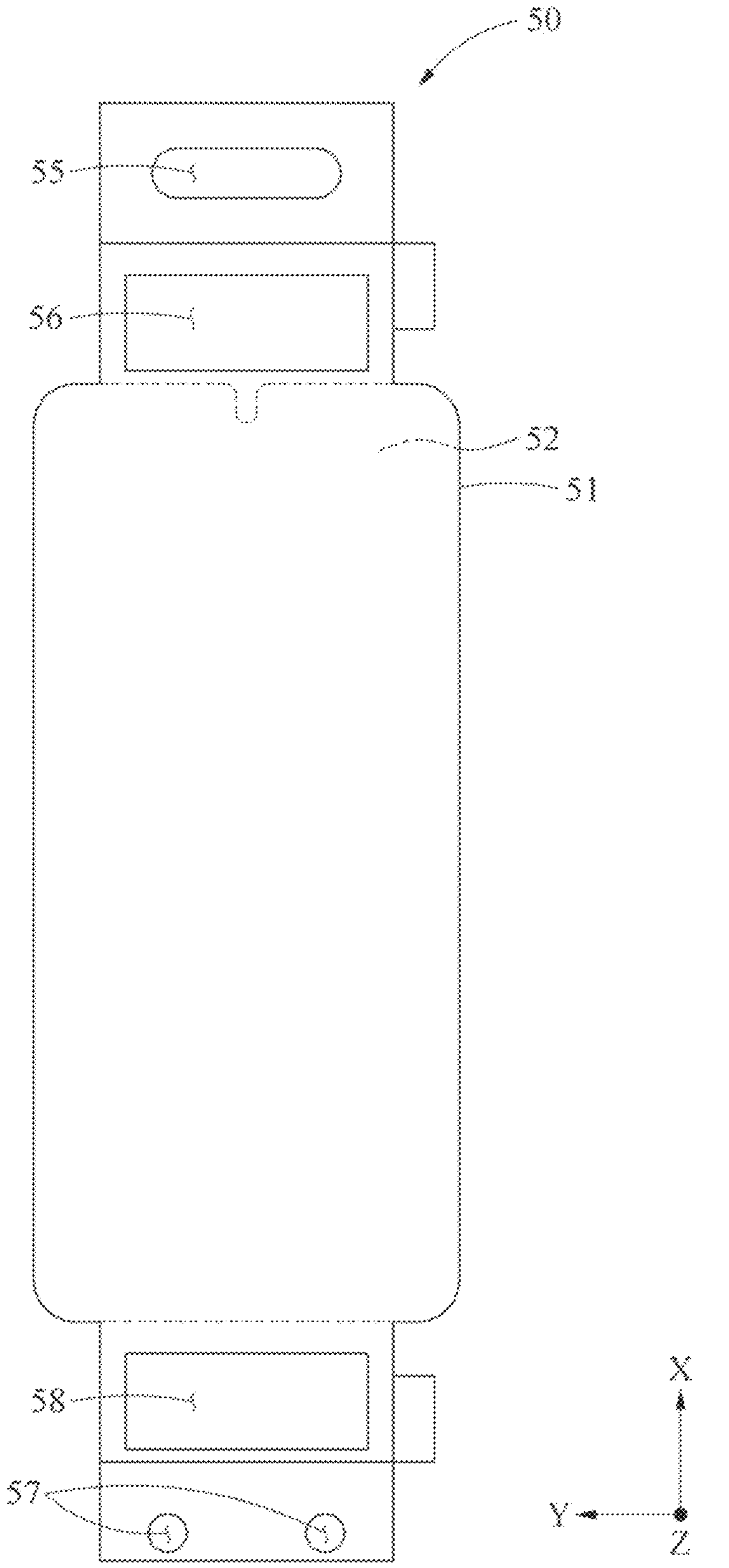
FIG. 2 is a plan view of a protective film according to one or more embodiments.
Figure 3A:
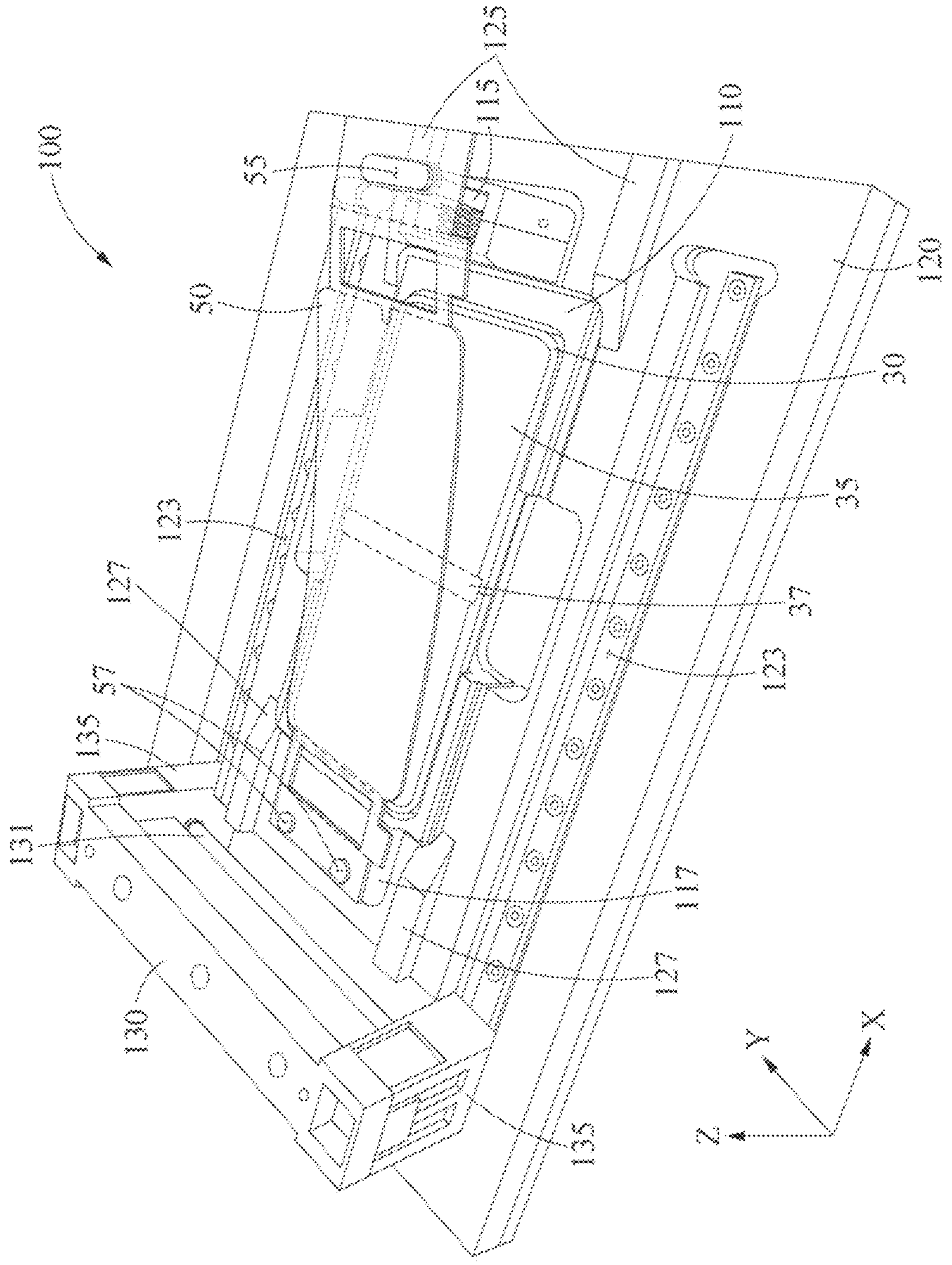
FIG. 3A is a perspective view of the protective film and the apparatus for attaching a protective film while an electronic device is seated, according to one or more embodiments.

In one or more embodiments, the apparatus for attaching a protective film 100 may be a device for attaching a protective film (e.g., a protective film 50 of FIG. 2) to a surface of a target device, such as an electronic device (e.g., an electronic device 30 of FIG. 3A). For example, the apparatus for attaching a protective film 100 may attach the protective film 50 to a surface (e.g., a surface 35 of the electronic device 30 of FIG. 3A), such as a display surface, an outermost surface of a display panel, or a glass layer or a protective layer of the display panel. Hereinafter, the apparatus for attaching a protective film 100 is described based on the target device being the electronic device 30 and an attachment part being the surface 35 of the electronic device 30, but embodiments are not limited thereto.

In one or more embodiments, the fixing tray 110 may include a seating portion 111, a first fixing guide 115, and a second fixing guide 117. The seating portion 111 may seat the electronic device 30. The fixing tray 110 may be coupled or fixed to the base 120, and the shape of the seating portion 111 may have various shapes depending on the shape of the electronic device 30.

In one or more embodiments, the seating portion 111 may have a plate shape having a predetermined thickness, and its center portion may be recessed. The electronic device 30 may be seated in the seating portion 111 such that the surface 35 of the electronic device 30 faces a front direction (e.g., a +Z direction).

For example, the seating portion 111 may be formed corresponding to a front surface where a display of the electronic device 30 is exposed and the shape of a rear surface facing an opposite direction to the front surface. When the electronic device is seated in the seating portion 111, the position of top and bottom and right and left (e.g., an X-Y plane direction) of the electronic device 30 may be fixed. At least some areas of the bottom surface of the seating portion 111 may be recessed corresponding to the shape of a component (e.g., a camera or a flash) protruding from the rear surface of the electronic device 30.

In one or more embodiments, the protective film 50 may be attached to the first fixing guide 115 and the second fixing guide 117. A relative position between the electronic device 30 and the protective film 50 may be fixed consistently through the seating portion 111, the first fixing guide 115, and the second fixing guide 117 such that the protective film 50 may be attached stably to the electronic device 30.

In one or more embodiments, the first fixing guide 115 and the second fixing guide 117 may be spaced apart in both directions (e.g., +/−X directions) based on the seating portion 111. The first fixing guide 115 and the second fixing guide 117 may protrude from the fixing tray 110 at a predetermined interval.

In one or more embodiments, the base 120 may include a coupling portion 121, a rail 123, a first protrusion 125, and a second protrusion 127. The coupling portion 121 may be coupled detachably to the fixing tray 110.

In one or more embodiments, the rail 123 may extend in a first direction (e.g., the +X direction) along a longitudinal direction (e.g., an X-axis direction) of the coupling portion 121. The rail 123 may guide the movement of the roller module 130. In one or more embodiments, the rail 123 may be a plurality of rails, and the plurality of rails 123 may be formed parallel to both sides in a width direction (e.g., a Y-axis direction) of the coupling portion 121, having the coupling portion 121 therebetween.

Hereinafter, a direction (e.g., the +X direction) in which the roller module 130 moves along the rail 123 is referred to as the ‘first direction’, and an opposite direction (e.g., the −X direction) thereto is referred to as a ‘second direction’. However, this is for ease of description, and the first direction and the second direction may be a plurality of paths or variable directions.

In one or more embodiments, the first protrusion 125 may protrude from the base 120 and may be a plurality of first protrusions. The plurality of first protrusions 125 may be formed parallel to a width direction (e.g., the Y-axis direction) of the coupling portion 121 and may be formed having, therebetween, a position corresponding to the first fixing guide 115 of the coupling portion 121. The plurality of first protrusions 125 may be formed such that a protrusion degree increases gradually along a longitudinal direction (e.g., the X-axis direction) of the base 120 to be consistent.

In one or more embodiments, the second protrusion 127 may protrude from the base 120 and may be a plurality of second protrusions. The plurality of second protrusions 127 may be formed parallel to the width direction (e.g., the Y-axis direction) of the coupling portion 121 and may be formed having, therebetween, a position corresponding to the second fixing guide 117 of the coupling portion 121. The plurality of second protrusions 127 may be formed such that a protrusion degree increases gradually along the longitudinal direction (e.g., the X-axis direction) of the base 120 and decreases again as it approaches the coupling portion 121.

In one or more embodiments, the roller module 130 may include a roller 131. The roller 131 may be included rotatably inside the roller module 130. The roller 131 may press the protective film 50 and/or the surface 35 of the electronic device 30 seated in the fixing tray 110.

In one or more embodiments, a roller mount 135 may support an end of a positive direction (e.g., the Y-axis direction) of the roller 131 and may be coupled to slide on the rail 123. The roller mount 135 may be a partial component of the roller module 130. The roller module 130 may slide and move in the first direction or the second direction (e.g., the −X direction) opposite to the first direction along the rail 123. The roller module 130 may be formed variously depending on the shape of the surface of the electronic device 30 included in the fixing tray 110.

FIG. 2 is a plan view of the protective film 50, according to one or more embodiments.

Referring to FIG. 2, the protective film 50 may include a first layer 51 and a second layer 52.

In one or more embodiments, the first layer 51 and the second layer 52 may be stacked in one direction (e.g., a Z-axis direction). The first layer 51 may extend in an upward direction (e.g., a +Z direction) of the second layer 52 and may be fixed to another support body (e.g., the apparatus for attaching a protective film 100 of FIG. 1) through a first hole 55 and a second hole 57. The second layer 52 may extend in a downward direction (e.g., a −Z direction) of the first layer 51 and may be separated from the first layer 51 and be attached to an attachment target (e.g., the electronic device 30 of FIG. 3A).

In one or more embodiments, the first layer 51 may include the first hole 55 and the second hole 57. The protective film 50 illustrated in FIG. 2 is an example of the protective film 50 that is applicable to the apparatus for attaching a protective film 100, and embodiments are not limited thereto.

In one or more embodiments, the second layer 52 of the protective film 50 may be attached to a surface (e.g., the surface 35 of the electronic device 30 of FIG. 3A) of an electronic device (e.g., the electronic device 30 of FIG. 3A).

For example, the protective film 50 may face a seating portion (e.g., the seating portion 111 of FIG. 1) of the apparatus for attaching a protective film 100, and the first layer 51 may be fixed to the apparatus for attaching a protective film 100. When the first layer 51 and the second layer 52 of the protective film 50 are pressed against the electronic device 30 by a roller (e.g., the roller 131 of FIG. 1), the second layer 52 may be attached to the surface 35 of the electronic device 30. The second layer 52 of the protective film 50 may be attached to the surface 35 of the electronic device 30 by separating the first layer 51 from the second layer 52.

In one or more embodiments, the first hole 55 may be formed in a first direction based on the second layer 52 of the protective film 50. A first fixing guide (e.g., the first fixing guide 115 of FIG. 1) of the apparatus for attaching a protective film 100 may be inserted into the first hole 55.

In one or more embodiments, the second hole 57 may be formed in a second direction (e.g., a −X direction) opposite to the first direction based on the second layer 52 of the apparatus for attaching a protective film 100. A second fixing guide (e.g., the second fixing guide 117 of FIG. 1) of the apparatus for attaching a protective film 100 may be inserted into the second hole 57.

In one or more embodiments, a plurality of second holes may be included, and the plurality of second holes 57 may be arranged corresponding to the shape and structure of the second fixing guide 117. For example, the plurality of second holes 57 may be designed to be symmetrical to both sides (e.g., +/−Y directions) based on the center (e.g., the center of a Y-axis direction) of the first hole 55 such that the plurality of second holes 57 may receive uniform tension based on the first hole 55, which is a single hole.

In one or more embodiments, a third hole 56 may be between the first hole 55 and the second layer 52, and a fourth hole 58 may be between the second hole 57 and the second layer 52. Each of the third hole 56 and the fourth hole 58 may play a role in absorbing and dispersing the tension (e.g., tension F of FIG. 3A), which is transmitted to the first hole 55 and the second hole 57, of the protective film 50 in an attachment process of the protective film 50. Alternatively, the protective film 50 may secure a tensile length in the first direction or the second direction through the third hole 56 and the fourth hole 58, and the protective film 50 may provide durability and flexibility.

Figure 3B:
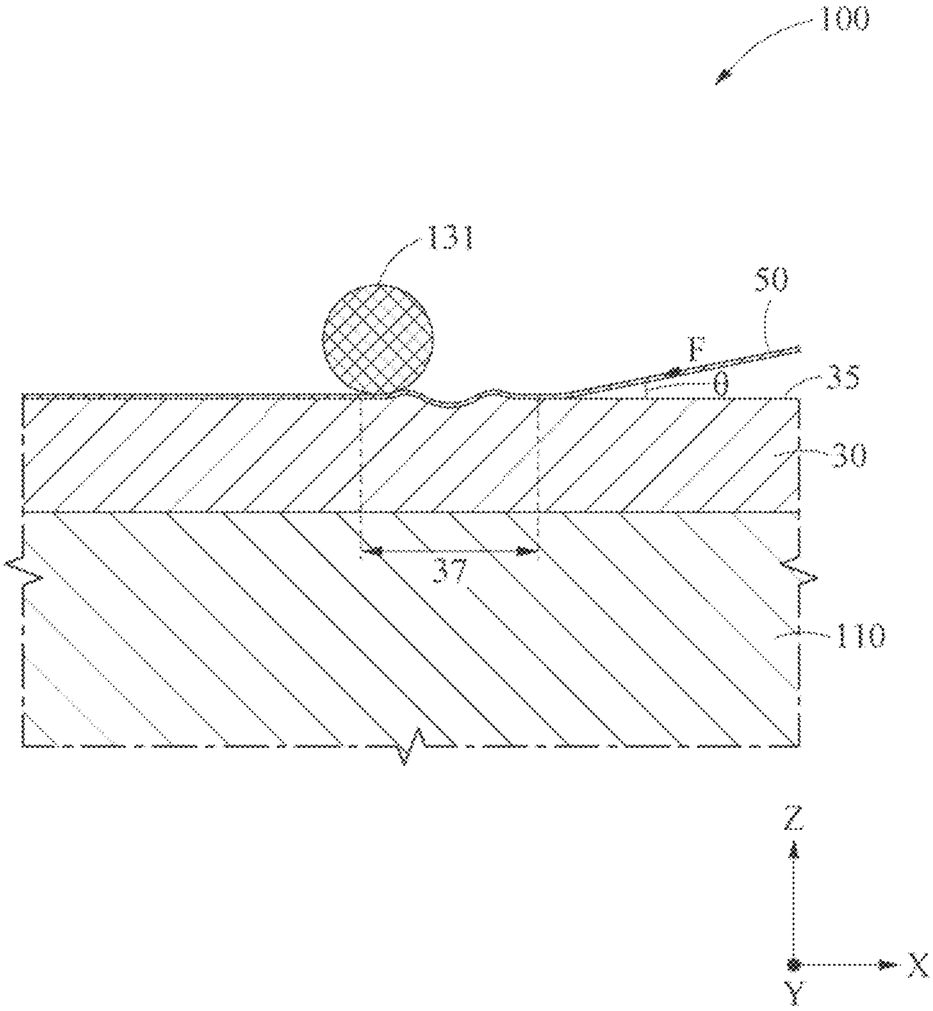
FIG. 3B is a diagram illustrating areas of the apparatus for attaching a protective film according to one or more embodiments.

FIG. 3A is a perspective view of the protective film 50 and the apparatus for attaching a protective film 100 while the electronic device 30 is seated, according to one or more embodiments, and FIG. 3B is a diagram schematically illustrating areas of the apparatus for attaching a protective film 100, according to one or more embodiments.

Referring to FIGS. 3A and 3B, the protective film 50 (e.g., the protective film 50 of FIG. 2), according to one or more embodiments, may be fixed to the apparatus for attaching a protective film 100 (e.g., the apparatus for attaching a protective film 100 of FIG. 1), and tension F applied to the protective film 50 may change according to the movement of the roller 131.

In one or more embodiments, at least one component or feature of the embodiments described above may be coupled to the apparatus for attaching a protective film 100 of FIGS. 3A and 3B.

In one or more embodiments, the electronic device 30 may be seated in the seating portion 111 of the apparatus for attaching a protective film 100. In one or more embodiments, at least some areas of the surface 35 of the electronic device 30 may be curved, flexible, or bendable, and the at least some areas may be a crease area 37.

In one or more embodiments, the crease area 37 may be substantially in or adjacent to the center based on a long axis (e.g., an X-axis) of the surface 35 of the electronic device 30. And/or, in one or more embodiments, the crease area 37 may be formed in a short axis (e.g., a Y-axis) of the surface 35 of the electronic device 30 or in a direction (e.g., a Y-axis direction) parallel to the roller 131.

Hereinafter, the electronic device 30 where the crease area 37 is formed horizontally with the roller 131 in the center of the long axis of the surface 35 of the electronic device 30 is described as a target device of the apparatus for attaching a protective film 100, but embodiments are not limited thereto.

In one or more embodiments, the protective film 50 may be inserted into and fixed to the first fixing guide 115 and the second fixing guide 117 of the apparatus for attaching a protective film 100 through the first hole 55 and the second hole 57.

For example, the first hole 55 of the protective film 50 may be inserted into the first fixing guide 115, the second hole 57 of the protective film 50 may be inserted into the second fixing guide 117, an end of a positive direction (e.g., an X-axis direction) of the protective film 50 may be fixed to the apparatus for attaching a protective film 100, and the protective film 50 may face the surface 35 of the electronic device 30. The first fixing guide 115 may support an end of the protective film 50 with the first hole 55 being fixed, and the second fixing guide 117 may support the other end of the protective film 50 with the second hole 57 being fixed.

In one or more embodiments, the height of the first fixing guide 115 may be different from the height of the second fixing guide 117. The first fixing guide 115 and the second fixing guide 117 may protrude from the fixing tray 110 in an upward direction (e.g., a +Z direction) and may have different heights. For example, the first fixing guide 115 may protrude in a position higher than that of the second fixing guide 117 from the fixing tray 110.

Hereinafter, the description of the first fixing guide 115 being formed higher than the second fixing guide 117, the roller 131 moving in a first direction (e.g., a +X direction), and the apparatus for attaching a protective film 100 attaching the protective film 50 to the surface 35 of the electronic device 30 is provided. However, embodiments are not limited thereto. For example, the first fixing guide 115 may be formed in a lower position than that of the second fixing guide 117. And/or the roller 131 may move in a direction (e.g., a −X direction) toward the second fixing guide 117 from the first fixing guide 115, and the protective film 50 may be attached to the surface 35 of the electronic device 30.

In one or more embodiments, the height of the first fixing guide 115 may be formed higher than the height of the second fixing guide 117, the second fixing guide 117 where the protective film 50 starts to be attached may narrow a gap between the protective film 50 and the surface 35 of the electronic device 30, and the position of the protective film 50 may be aligned precisely with the electronic device 30. The first fixing guide 115 where the protective film 50 is attached to the electronic device 30 may secure a gap between the surface 35 of the electronic device 30 and the protective film 50, inducing the protective film 50 to be attached closely to the surface according to the movement of the roller 131.

In one or more embodiments, the roller module 130 may press the roller 131 in a downward direction (e.g., a −Z direction) and may slide in the first direction (e.g., the +X direction) along the rail 123. The movement of the roller module 130 may be driven by the power of the apparatus for attaching a protective film 100 itself or may be driven by a user or external force.

For example, to drive the roller module 130 of the apparatus for attaching protective film 100 by its own power, the roller module 130 may support the roller 131 through a spring or an elastic body, which provides elastic force downward, such that the roller 131 slides to be pressed downward. Alternatively, the apparatus for attaching protective film 100 includes a pneumatic module, and the roller module 130 may slide in the first direction to increase pneumatic pressure and put pressure downward. In one or more embodiments, while the protective film 50 is fixed to the first fixing guide 115 and the second fixing guide 117, the roller 131 may slide in the first direction. The roller 131 may be pressed and may move in a direction (e.g., the −Z direction) of the surface 35 of the electronic device 30 and may attach the protective film 50 to the surface 35 of the electronic device 30.

In one or more embodiments, the electronic device 30 and the protective film 50 may have bubbles in or adjacent to the crease area 37. The crease area 37 may be more curved or have a slightly higher or lower height compared to another area of the surface 35 of the electronic device 30, and accordingly, may have a higher probability of having bubbles compared to the other area.

According to one or more embodiments, to prevent bubbles, the apparatus for attaching a protective film 100 may design an angle θ between the protective film 50 and the surface 35 of the electronic device 30 adjacent to the crease area 37 to be relatively greater. Alternatively, according to one or more embodiments, to prevent bubbles, the apparatus for attaching a protective film 100 may increase the force that the roller 131 uses to press the protective film 50 and the surface 35 of the electronic device 30 adjacent to the crease area 37, and, for example, may design the height of the first fixing guide 115 to be relatively higher.

In one or more embodiments, as the roller 131 presses the protective film 50, the tension F may be applied to the protective film 50 and the tension F may change (increase or decrease). The size of force applied in a vertical direction (e.g., a Z-axis direction) of the tension F based on the angle θ between the protective film 50 and the surface 35 of the electronic device 30 may vary. As the size of the force applied in the vertical direction of the tension F increases, the roller 131 may further press the protective film 50 and the surface 35 accordingly, which may reduce or suppress bubbles between the protective film 50 and the surface 35.

For example, when the roller 131 moves adjacent to the crease area 37, the tension of the protective film 50 may be adjusted elastically and finely by the first fixing guide 115. As the tension of the protective film 50 is adjusted finely, the apparatus for attaching a protective film 100 may reduce and suppress bubbles between the protective film 50 and the surface 35, especially adjacent to the crease area 37.

In one or more embodiments, for example, when the height of the first fixing guide 115 is relatively not higher, i.e., a difference between the height of the first fixing guide 115 and the height of the second fixing guide 117 is not great, the angle θ between the protective film 50 and the surface 35 of the electronic device 30 may decrease. By doing so, the size of the force (e.g., a second tension element Fz of FIG. 6A) in the vertical direction of the tension F of the protective film 50 may decrease, causing bubbles between the surface 35 and the protective film 50.

In one or more embodiments, as the first fixing guide 115 is formed in a relatively higher position than that of the second fixing guide 117, the angle θ between the protective film 50 and the surface 35 of the electronic device 30 may increase, and accordingly, the size of the force in the vertical direction of the tension F may increase, reducing or suppressing bubbles between the surface 35 and the protective film 50.

In one or more embodiments, if the angle θ between the protective film 50 and the surface 35 of the electronic device 30 is relatively small, the protective film 50 may likely contact the surface 35 of the electronic device 30 before the roller 131 contacts the protective film 50 in a partial area, which may result in bubbles or poor attachment. The maintaining of the angle θ between the protective film 50 and the surface 35 of the electronic device 30 to be relatively great may reduce or prevent bubbles and/or poor attachment.

Figure 4:
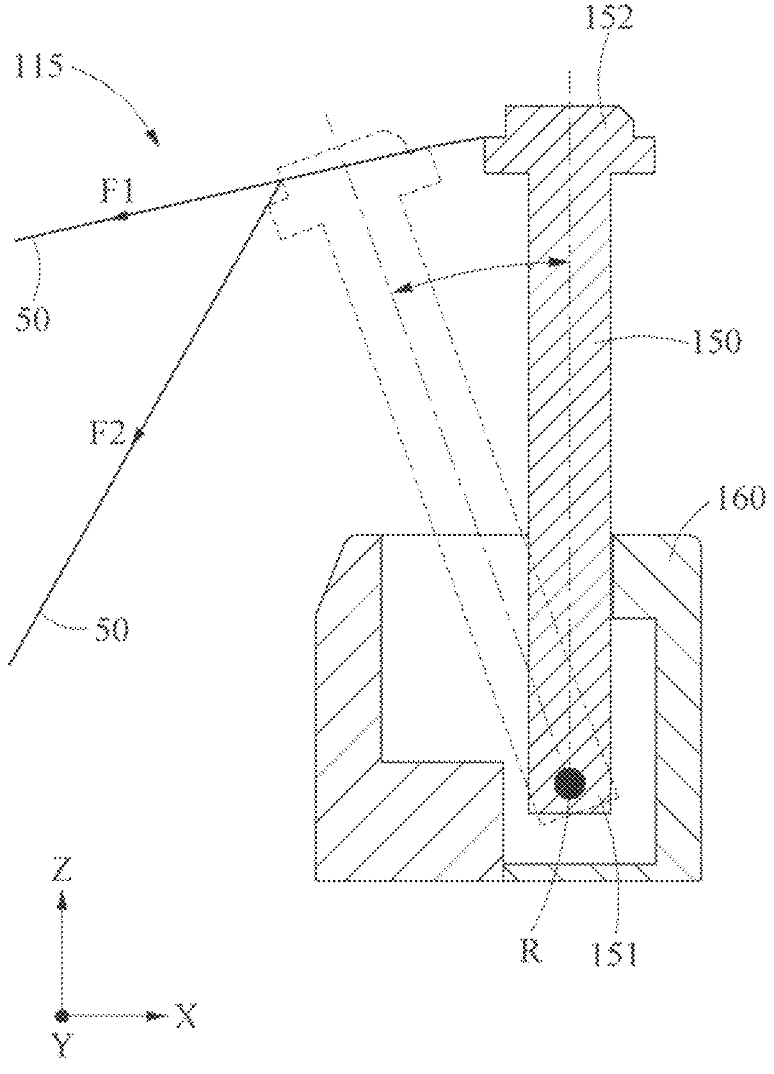
FIG. 4 is a cross-sectional view of a first fixing guide according to one or more embodiments.

FIG. 4 is a cross-sectional view of the first fixing guide 115, according to one or more embodiments.

Referring to FIG. 4, according to one or more embodiments, the first fixing guide 115 may include the guide block 150 and the guide housing 160.

In one or more embodiments, at least one component or feature of the embodiments described above may be coupled to the first fixing guide 115 of FIG. 4 and an apparatus for attaching a protective film (e.g., the apparatus for attaching a protective film 100 of FIG. 1, FIG. 3A, or FIG. 3C) including the first fixing guide 115.

In one or more embodiments, an end of a protective film (e.g., the protective film 50 of FIG. 2), for example, a first hole (e.g., the first hole 55 of FIG. 2) may be fastened to the guide block 150. The guide block 150 may be supported to be tilted or rotatable around a rotation axis R.

In one or more embodiments, the guide housing 160 may accommodate at least some areas of the guide block 150. The guide housing 160 may be fastened to a fixing tray (e.g., the fixing tray 110 of FIG. 1) of the apparatus for attaching a protective film 100. The guide block 150 may be accommodated by an inner surface of the guide housing 160, and the guide housing 160 may have an open-shaped inner surface corresponding to a movement range of the guide block 150 such that the guide block 150 may be tilted.

For example, the guide block 150 may include the first end 151 inside the guide housing 160 and the second end 152 opposite to the first end 151. The second end 152 may extend in a direction away from the guide housing 160. An end of the protective film 50, for example, the first hole 55 of the protective film 50, may be fastened to the second end 152. However, the structure of the guide block 150 is not limited thereto, and embodiments may have various shapes and structures.

Figure 7A:
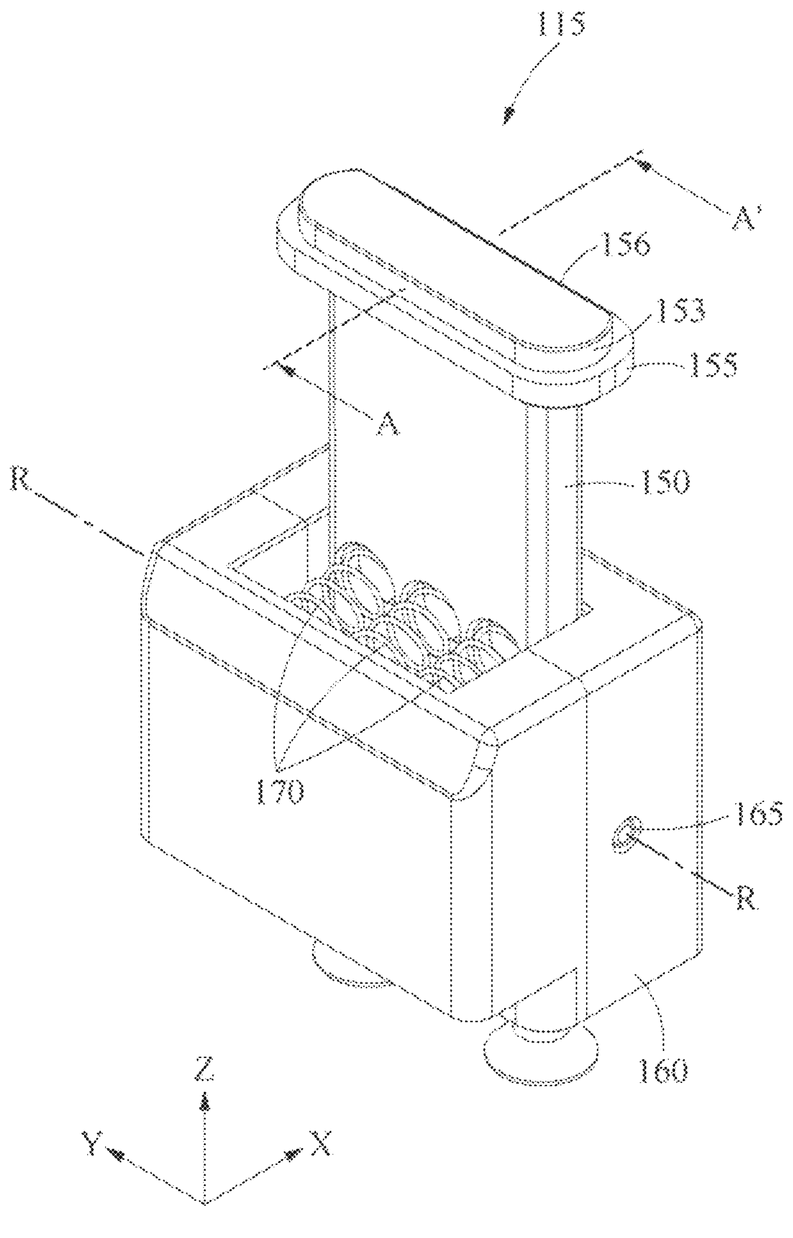
FIG. 7A is a perspective view of a first fixing guide according to one or more embodiments.
Figure 8A:
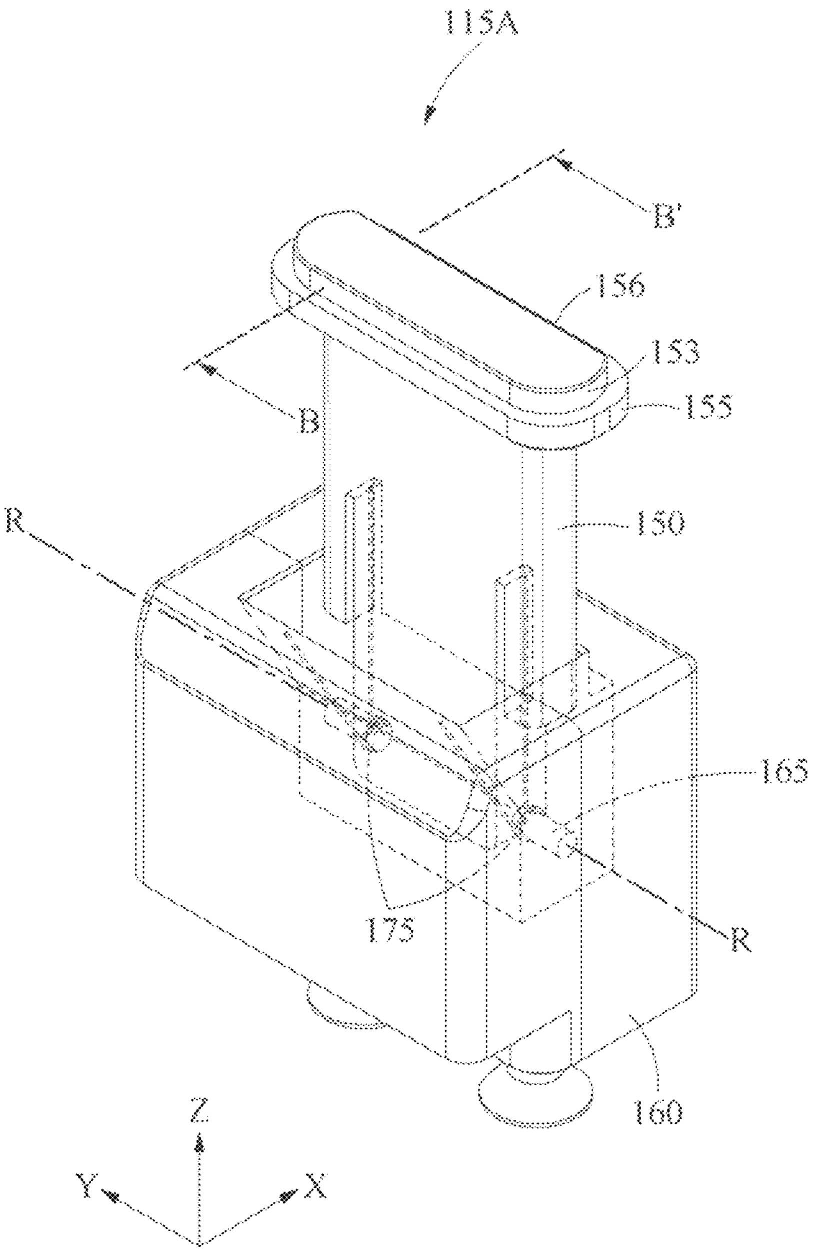
FIG. 8A is a perspective view of a first fixing guide according to one or more embodiments.

The first fixing guide 115 may include an elastic member (e.g., the elastic member 170 of FIG. 7A or the elastic member 175 of FIG. 8A). In one or more embodiments, the elastic member 170 or 175 may be in a specific position of the guide housing 160, elastic force may be applied to the guide block 150, and restoring force may be provided in a first direction with respect to the movement of the guide block 150.

In one or more embodiments, the guide block 150 may be tilted in a second direction (e.g., a −X direction) based on the rotation axis R by the tension (e.g., the tension F of FIG. 3B) of the protective film 50. As the guide block 150 is tilted in the second direction, the tension F of the protective film 50 may be dispersed or relieved.

In one or more embodiments, as the height of the first fixing guide 115 relatively increases compared to the height of the second fixing guide 117, the tension F applied to the protective film 50 may increase. If the tension F increases excessively, the protective film 50 may be deformed, or at least some areas of the protective film 50 may be cut or damaged.

For example, if the tension F applied to the protective film 50 is less than or equal to a certain level, for example, in the case of first tension F1 of FIG. 4, the guide block 150 may be not tilted or tilted slightly and may substantially maintain a perpendicular state to the guide block 150. If the tension F of the protective film 50 is greater than or equal to the certain level, for example, in the case of second tension F2 of FIG. 4, the guide block 150 may be tilted in the second direction (e.g., the −X direction) in which the tension F of the protective film 50 acts.

In one or more embodiments, as the guide block 150 is tilted and moves, a distance from a current attachment point of the protective film 50 and a surface (e.g., the surface 35 of the electronic device 30 of FIG. 3A) to the first hole (e.g., the first hole 55 of FIG. 2) may be closer, and accordingly, the tension F applied to the protective film 50 may decrease.

In one or more embodiments, as the first fixing guide 115 may be tilted, the first fixing guide 115 may substantially absorb or buffer the tension F applied to the protective film 50. Accordingly, the apparatus for attaching a protective film 100 may prevent the protective film 50 from being deformed or damaged by the tension (e.g., the second tension F2) greater than or equal to the certain level.

Each of FIGS. 5A, 5B, 5C, 5D, and 5E is a side view of a state of an attachment operation of the protective film 50 of the apparatus for attaching a protective film 100, according to one or more embodiments.

Referring to FIGS. 5A, 5B, 5C, 5D, and 5E, according to one or more embodiments, the first fixing guide 115 of the apparatus for attaching a protective film 100 may be tilted at a predetermined angle according to the movement of the roller 131.

In one or more embodiments, at least one component or feature of the embodiments described above may be coupled to the apparatus for attaching a protective film 100 of FIGS. 5A, 5B, 5C, 5D, and 5E.

Figure 5A:
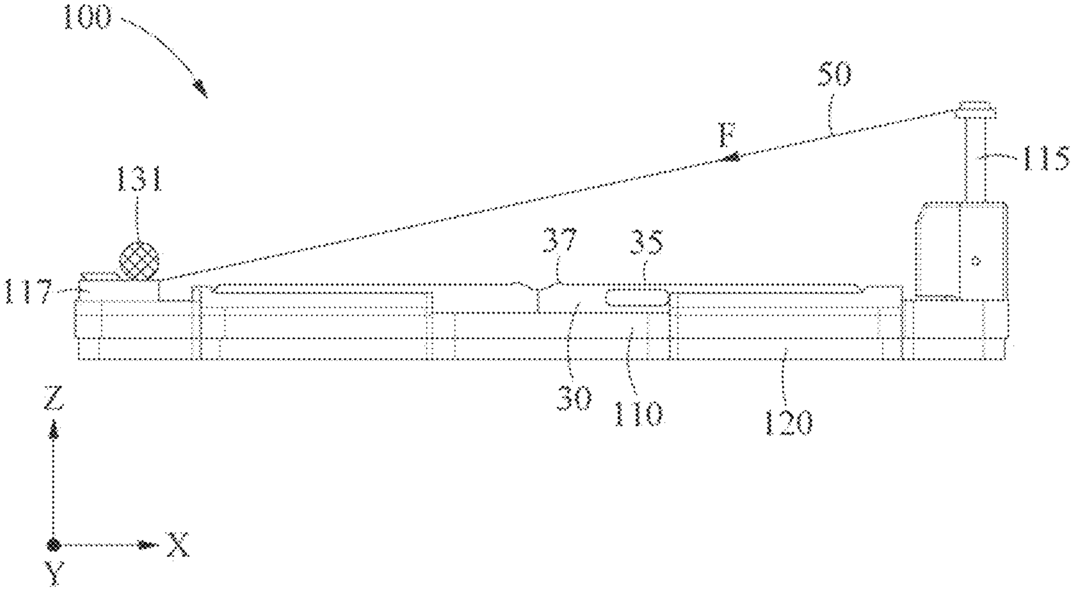
FIG. 5A is a side view of a state of a protective film attachment operation of the apparatus for attaching a protective film according to one or more embodiments.

In one or more embodiments, as illustrated in FIG. 5A, the electronic device 30 may be seated in the apparatus for attaching a protective film 100. Both ends of the protective film 50 may be fixed respectively to the first fixing guide 115 and the second fixing guide 117 such that the protective film 50 may be on the surface 35 of the electronic device 30. The roller 131 may start from a position adjacent to the second fixing guide 117 and may slide and move in a first direction. The roller 131 may move while pressing the protective film 50 and the surface 35 of the electronic device 30 and may attach the protective film 50 to the surface 35 of the electronic device 30.

Figure 5B:
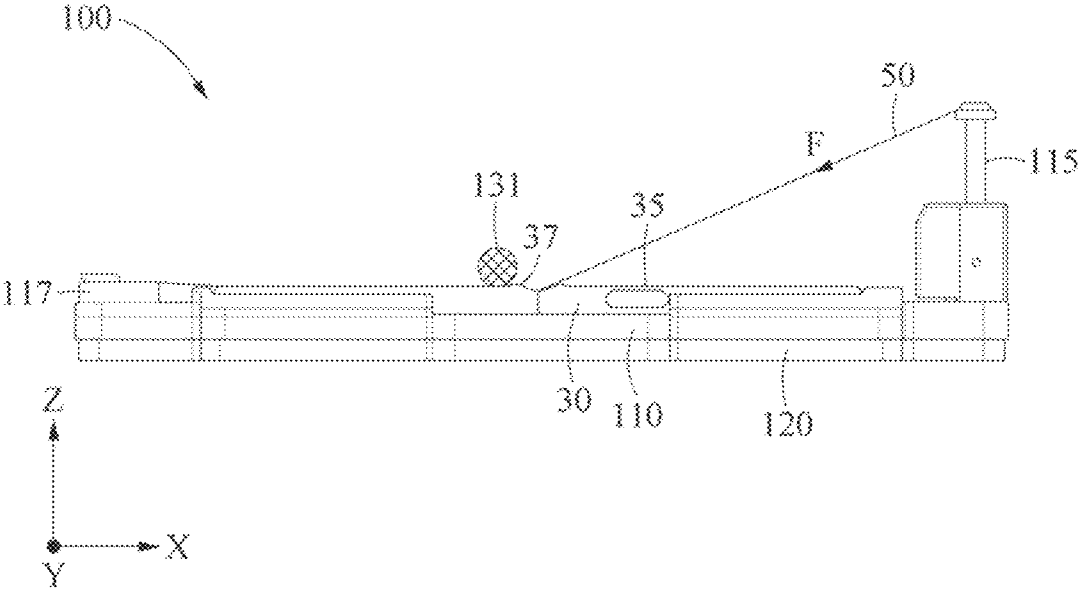
FIG. 5B is a side view of a state of a protective film attachment operation of the apparatus for attaching a protective film according to one or more embodiments.

In one or more embodiments, as illustrated in FIG. 5B, during a certain initial section of a movement range of the roller 131, the first fixing guide 115 may maintain an initial state without being tilted. For example, a state in which the first fixing guide 115 is substantially perpendicular (e.g., a +Z direction) to a surface (e.g., an X-Y plane) that is horizontal to the surface 35 of the electronic device 30 may be an initial state of the first fixing guide 115. The tension F applied to the protective film 50 may be less than or equal to a certain level until the roller 131 passes a specific section, and the first fixing guide 115 may maintain the initial state without being tilted.

Figure 5C:
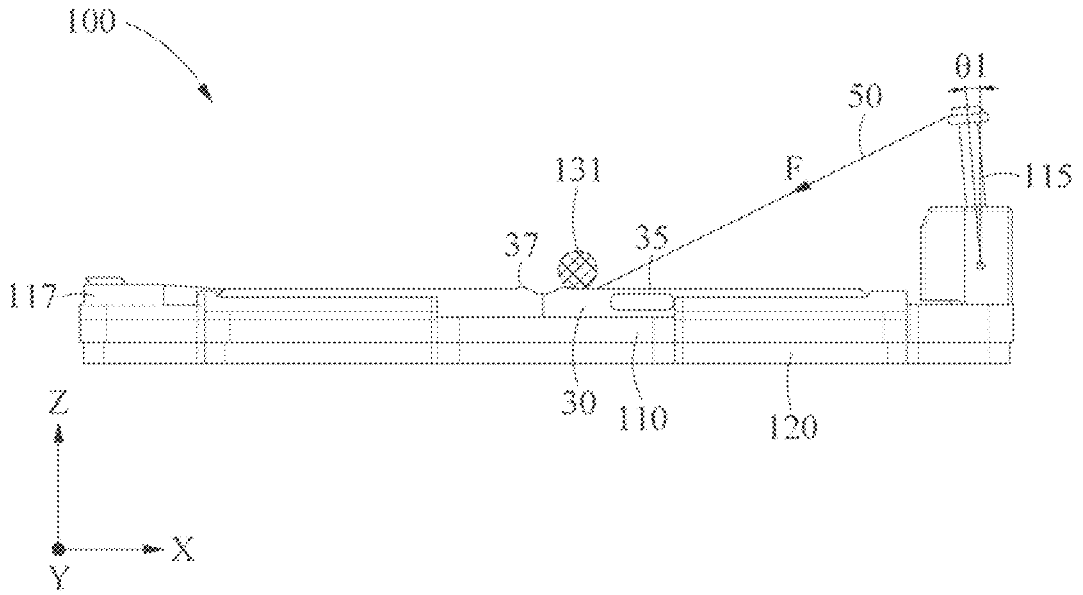
FIG. 5C is a side view of a state of a protective film attachment operation of the apparatus for attaching a protective film according to one or more embodiments.

In one or more embodiments, as illustrated in FIG. 5C, the roller 131 passes the specific section, and the first fixing guide 115 may be tilted at a predetermined first angle θ1 from the initial state. For example, the specific section where the first fixing guide 115 starts to be tilted may be the crease area 37 of the surface 35 of the electronic device 30 or an area before and after the crease area 37. The roller 131 should further press the protective film 50 adjacent to a crease section, and accordingly, the tension F applied to the protective film 50 may increase.

In one or more embodiments, the first fixing guide 115 may apply high tension F to the protective film 50 adjacent to the crease area 37. The first fixing guide 115 may be not tilted or relatively less tilted adjacent to the crease area 37 and may be designed to withstand the tension F of the protective film 50. By doing so, according to one or more embodiments, the apparatus for attaching a protective film 100 may maintain the height of the first fixing guide 115 being relatively higher than the height of the second fixing guide 117. For example, the predetermined first angle θ1 may be a range of 1 to 7 degrees based on the initial state.

Figure 5D:
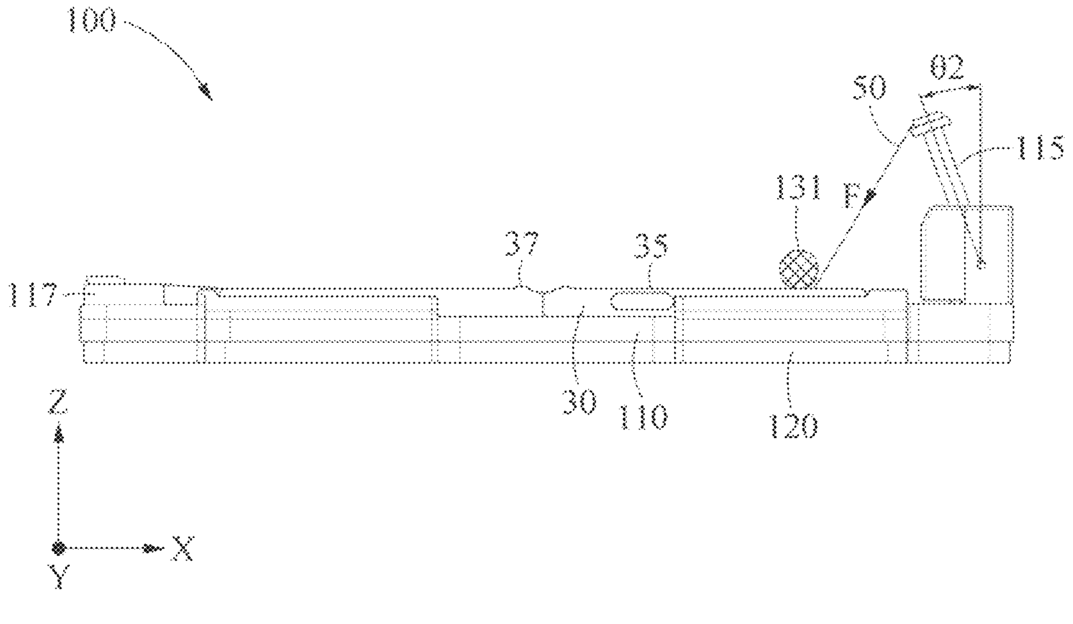
FIG. 5D is a side view of a state of a protective film attachment operation of the apparatus for attaching a protective film according to one or more embodiments.

In one or more embodiments, as illustrated in FIG. 5D, the roller 131 passes the specific section and further moves in the first direction, and the first fixing guide 115 may be further tilted at a predetermined second angle θ2 from the initial state. For example, the predetermined second angle θ2 may be a range of 15 to 25 degrees based on the initial state.

In one or more embodiments, the first fixing guide 115 may be tilted in the range of 15 to 25 degrees in a second direction from a direction (e.g., a +Z direction or a direction of the initial state) perpendicular to the surface 35 of the electronic device 30 as the roller module 130 moves in the first direction.

For example, the tension F applied to the protective film 50 may increase as the first fixing guide 115 is closer to the roller 131 after passing the crease area 37. An area after the crease area 37, unlike the crease area 37, may not require relatively great tension F. If the tension F of the protective film 50 increases, the protective film 50 may be deformed or damaged, and thus, it may be advantageous to reduce the tension F in that section.

In one or more embodiments, as the guide block 150 is tilted in a specific section, the first fixing guide 115 may reduce or disperse the tension F applied to the protective film 50 in the specific section and may increase the tension F applied to the protective film 50 in another section excluding the specific section.

For example, if the crease area 37 is formed in the center of the first direction and the second direction of the surface 35 of the electronic device 30, the apparatus for attaching a protective film 100 may increase the tension F applied to the protective film 50 adjacent to the crease area 37 and may disperse or absorb the tension F applied to the protective film 50 again after passing the crease area 37.

Figure 5E:
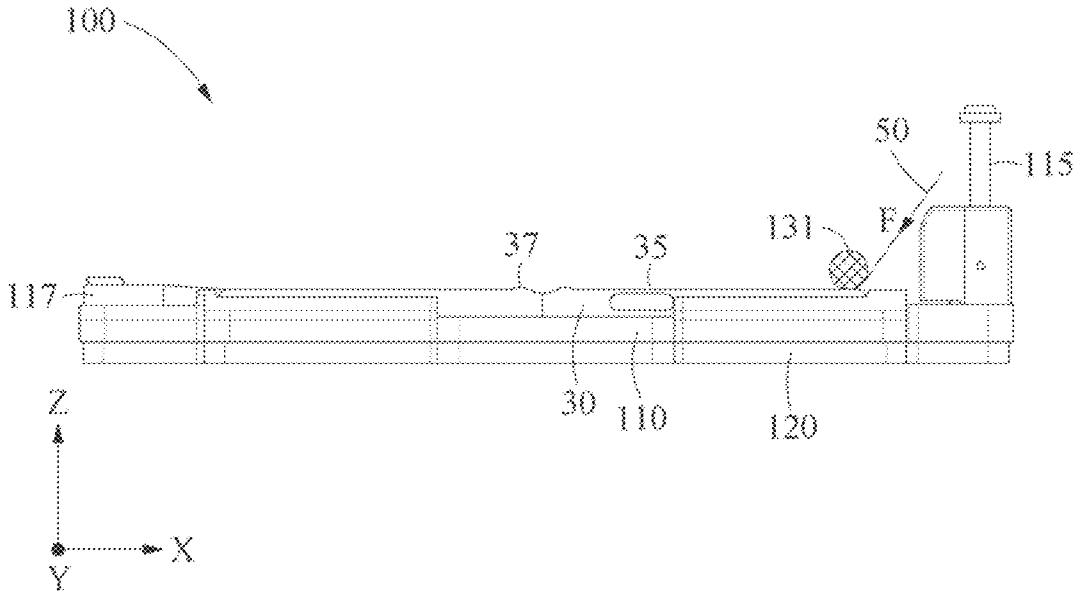
FIG. 5E is a side view of a state of a protective film attachment operation of the apparatus for attaching a protective film according to one or more embodiments.

In one or more embodiments, as illustrated in FIG. 5E, when the roller 131 is closer to an end state adjacent to the first fixing guide 115, the protective film 50 may be detached automatically from the guide block 150. When the protective film 50 is detached, the guide block 150 may return to the initial state before being tilted the same as in the initial state. The structure that the protective film 50 is detached automatically from the guide block 150 is described with reference to FIGS. 6A and 6B.

Figure 6A:
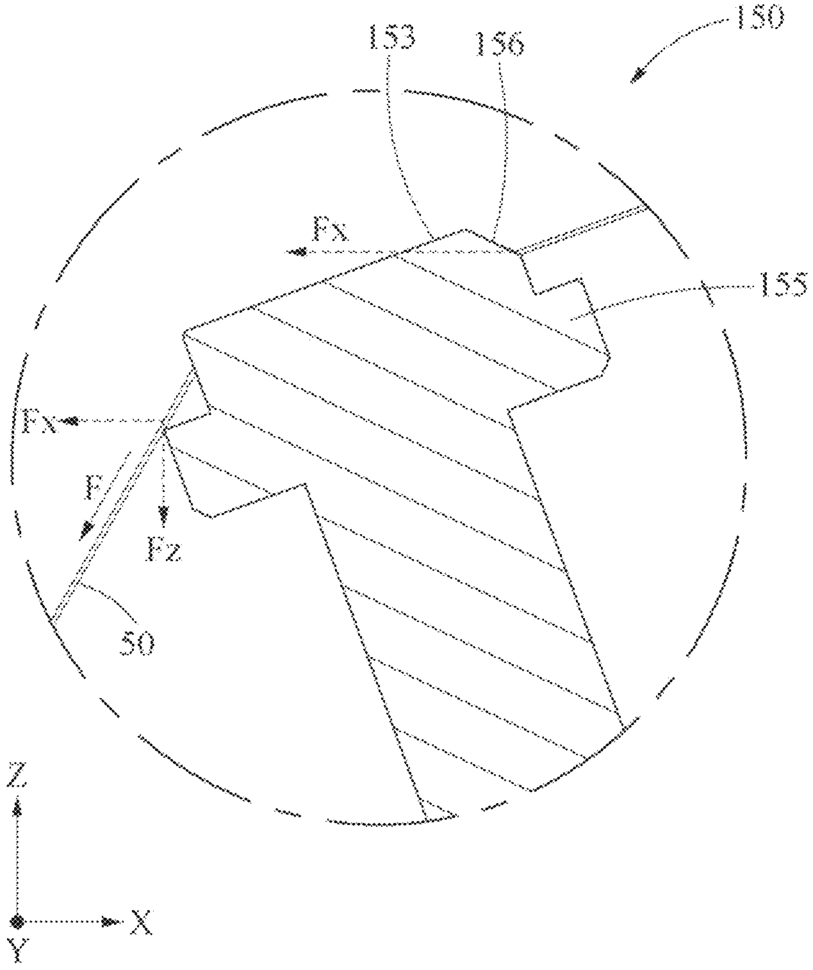
FIG. 6A is a cross-sectional view of an example of a guide block according to one or more embodiments.
Figure 6B:
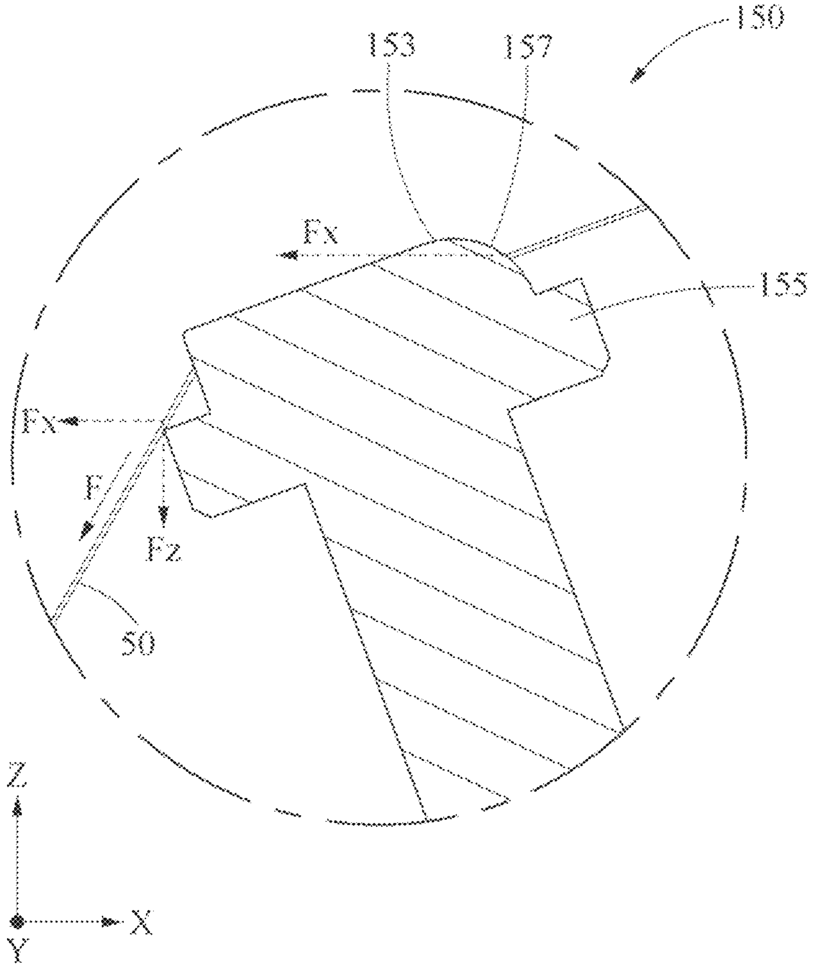
FIG. 6B is a cross-sectional view of an example of a guide block according to one or more embodiments.

FIG. 6A is a cross-sectional view of an example of the guide block 150, according to one or more embodiments, and FIG. 6B is a cross-sectional view of an example of the guide block 150, according to one or more embodiments.

Referring to FIGS. 6A and 6B, the guide block 150 may include a head area 153, a protruding area 155, and a chamfering surface 156 or 157.

In one or more embodiments, at least one component or feature of the embodiments described above may be coupled to the guide block 150 of FIGS. 6A and 6B and an apparatus for attaching a protective film (e.g., the apparatus for attaching a protective film FIG. 1, 3A, or 3C, or FIGS. 5A to 5E) including the guide block 150.

In one or more embodiments, the head area 153 may be an area to which an end of a protective film (e.g., the protective film 50 of FIG. 2), for example, a first hole (e.g., the first hole 55 of FIG. 2) may be fastened. The head area 153 may be formed at an end of the guide block 150, for example, may be formed at an end (e.g., the second end 152 of FIG. 4) opposite to an end (e.g., the first end 151 of FIG. 4) inserted into the guide housing 160.

In one or more embodiments, the protruding area 155 may be formed below (e.g., in a −Z direction) the head area 153. The protruding area 155 may protrude from at least some areas of the circumference of the guide block 150. The protruding area 155 may face a surface adjacent to the first hole 55 of the protective film 50. The protruding area 155 may limit a movement range of the protective film 50 such that the protective film 50 may not slip or deviate below the protruding area 155.

In one or more embodiments, the chamfering surface 156 or 157 may be formed in a first direction from an edge of the head area 153. The chamfering surface 156 or 157 may help the protective film 50 to be detached automatically or easily while the guide block 150 is tilted at a certain level or more, for example, in a state of the guide block 150 of FIG. 5D.

For example, the tension F of the protective film 50 may include a first tension element Fx toward an axis direction (e.g., an X-axis direction) parallel to the first direction and a second direction and the second tension element Fz toward a direction (e.g., a Z-axis direction) perpendicular to an upper part of the protective film 50. As a roller (e.g., the roller 131 of FIG. 1 or 3B or FIGS. 5A to 5E) moves in the first direction, the first tension element Fx and the second tension element Fz may increase. In a state (e.g., the state of FIG. 5D or 5E) the roller 131 moves to a position adjacent to the first fixing guide 115, the guide block 150 may be tilted in the second direction. In a state where the guide block 150 is tilted, an end of the protective film 50 may be adjacent to a chamfering surface, and, as the tension F increases, by an increased first tension element Fx, the protective film 50 may slide on the chamfering surface 156 or 157 to be detached.

In one or more embodiments, the apparatus for attaching a protective film 100 may separate the protective film 50 from the guide block 150 substantially automatically or semi-automatically through the chamfering surface 156 or 157.

For example, as illustrated in FIG. 6A, according to one or more embodiments, the chamfering surface 156 may have a bevel shape substantially. As the roller 131 moves and the first tension element Fx increases, the first tension element Fx applied between the protective film 50 and the head area 153 may increase. As the guide block 150 is tilted and the protective film 50 is adjacent to a lower corner of the chamfering surface 156, the protective film 50 may be detached from the guide block 150 by passing on the chamfering surface 156 by the increased first tension element Fx.

For example, as illustrated in FIG. 6B, according to one or more embodiments, the chamfering surface 157 may have a rounded shape. Through the rounded shape, the protective film 50 may be detached softly from the guide block 150. As the roller 131 moves and the first tension element Fx increases, the first tension element Fx applied between the protective film 50 and the chamfering surface 157 may increase. If the increased first tension element Fx exceeds a certain range, the protective film 50 may slide on the chamfering surface 157 and may be detached from the guide block 150.

The shape and structure of the chamfering surface 156 or 157 of FIGS. 6A and 6B are just an example, and embodiments are not limited thereto. The detachment of the protective film 50 may be implemented in implementable structures through the driving process described above.

Figure 7B:
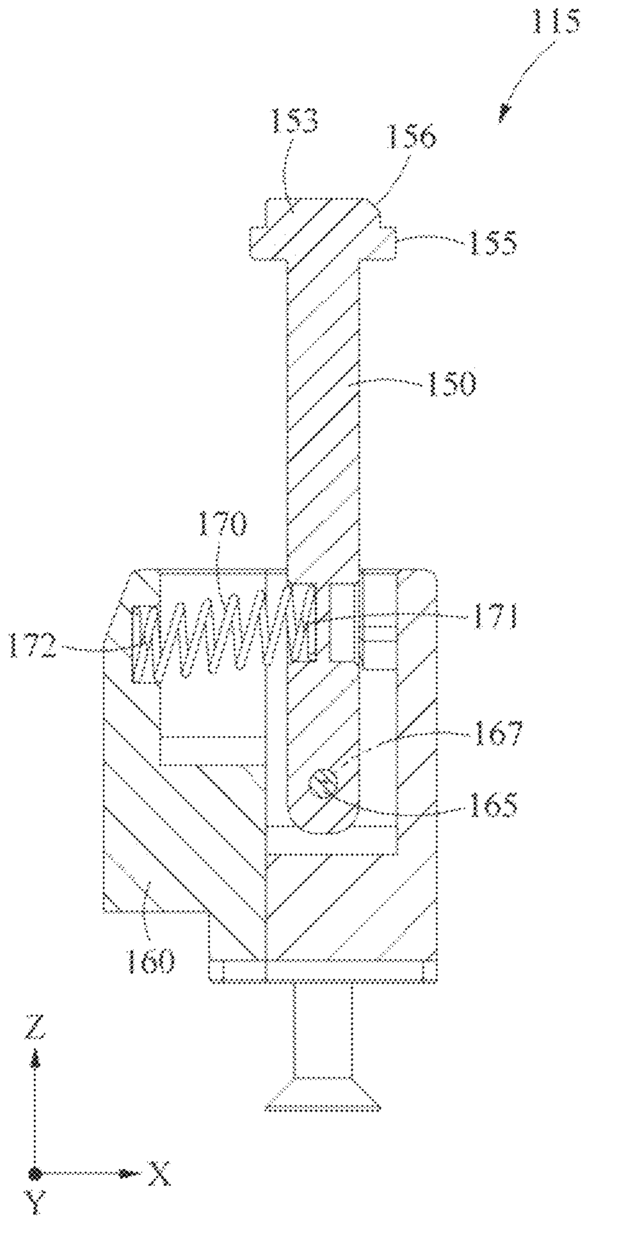
FIG. 7B is a cross-sectional view of a first fixing guide according to one or more embodiments.

FIG. 7A is a perspective view of the first fixing guide 115, according to one or more embodiments, and FIG. 7B is a cross-sectional view of the first fixing guide 115, according to one or more embodiments. Specifically, FIG. 7B is a cross-sectional view of the first fixing guide 115 along the A-A' line of FIG. 7A.

Referring to FIGS. 7A and 7B, according to one or more embodiments, the elastic member 170 of the first fixing guide 115 may be between the guide block 150 and the guide housing 160.

In one or more embodiments, at least one component or feature of the embodiments described above may be coupled to the first fixing guide 115 of FIGS. 7A and 7B and an apparatus for attaching a protective film (e.g., the apparatus for attaching a protective film FIG. 1 or 3A or 3B, or FIGS. 5A to 5E) including the first fixing guide 115.

In one or more embodiments, the elastic member 170 may extend in a second direction from the guide block 150. In one or more embodiments, the elastic member 170 may be fixed to both ends of the guide block 150 and the guide housing 160 and may be between the guide block 150 and the guide housing 160.

In one or more embodiments, the elastic member 170 may extend in an upper direction (e.g., a +Z direction) than the rotation axis R and may be compressed in a first direction and/or the second direction by the movement of the guide block 150. The elastic member 170 in a compressed state may provide elastic force or restoring force in the first direction with respect to the guide block 150.

In one or more embodiments, the elastic member 170 may support tension (e.g., the tension F of FIG. 3B, FIGS. 5A to 5E, or FIG. 6A or 6B) applied to the guide block 150 to a certain level of state (e.g., a state of the apparatus for attaching a protective film 100 of FIG. 5B) by a protective film (e.g., the protective film 50 of FIG. 2, 3A, 3B, or 4, FIGS. 5A to 5E, or FIG. 6A or 6B). As the elastic member 170 supports the guide block 150, the tension F applied to the protective film 50 may increase. The apparatus for attaching a protective film 100 may increase the tension F of the protective film 50 and may prevent bubbles or poor attachment of the protective film 50 in that section, for example, in the crease area 37.

In one or more embodiments, if the tension F enters a state (e.g., the state of the apparatus for attaching a protective film 100 of FIG. 5C) exceeding the certain level of state, the elastic member 170 may be compressed and the guide block 150 may be tilted. The apparatus for attaching a protective film 100 may reduce the tension F applied to the protective film 50 in that section, for example, after a crease area (e.g., the crease area 37 of FIG. 3A or 3B or FIGS. 5A to 5E), and may prevent the protective film 50 from being deformed or damaged.

In one or more embodiments, the elastic member 170 may be implemented as a spring. The first fixing guide 115 may include a plurality of elastic members 170, and the plurality of elastic members 170 may extend in a direction (e.g., a Y-axis direction). The shape and structure of the elastic member 170 may be implemented variously. For example, the single elastic member 170 implemented as a spring may have a thickness of 0.4 mm and a diameter of 5.0 mm, but examples are not limited thereto.

The shape and structure of the first fixing guide 115 of FIGS. 7A and 7B are just an example, and embodiments are not limited thereto. For example, an elastic member may extend in the first direction with respect to the guide block 150 and may be between the guide block 150 and the guide housing 160. The elastic member may be below (e.g., in the −Z direction) a shaft member 165, and the first end 151 of the guide block 150 is pressed in the second direction to provide the guide block 150 with restoring force.

In one or more embodiments, the guide block 150 may include a first accommodating groove 171 in a surface facing the second direction. The guide housing 160 may include a second accommodating groove 172 in an inner surface facing the first accommodating groove 171. An end of the elastic member 170 may be inserted into the first accommodating groove 171, and an end that is opposite to the other end may be inserted into the second accommodating groove 172. The first accommodating groove 171 and the second accommodating groove 172 may prevent the elastic member 170 from being detached.

In one or more embodiments, the first fixing guide 115 may include the shaft member 165. The shaft member 165 may support the guide block 150 such that the guide block 150 may be tilted in the first direction or the second direction. The guide block 150 may tilt the shaft member 165 to the rotation axis R.

In one or more embodiments, the shaft member 165 may be formed in a through-hole structure that is inserted into an opening formed in the guide housing 160. For example, the shaft member 165 may be implemented as a shaft or a cylindrical member and may be fastened rotatably to the guide housing 160. In addition, the shaft member 165 may be implemented in a protruding structure (e.g., the structure of FIG. 8A) formed in the guide housing 160 inside the guide housing 160. The shaft member 165 in a protruding structure may be applied substantially equally or similarly to the first fixing guide 115 of FIG. 7A.

For example, the guide block 150 may include a guide hole 167 formed therethrough in one direction (e.g., a Y-axis direction), and the shaft member 165 may be fixed to the guide housing 160 while being inserted into the guide hole 167.

In one or more embodiments, the first fixing guide 115 may adjust elements, such as a tilting start point, a tilting range, or restoring force of the guide block 150, according to various elements, such as the position of the first accommodating groove 171 and/or the guide hole 167 formed in the guide block 150, the position of the shaft member 165 fixed to the guide housing 160, the position of the second accommodating groove 172, or the type and structure of the elastic member 170. The first fixing guide 115 of FIGS. 7A and 7B is just an example, and embodiments are not limited thereto.

Figure 8B:
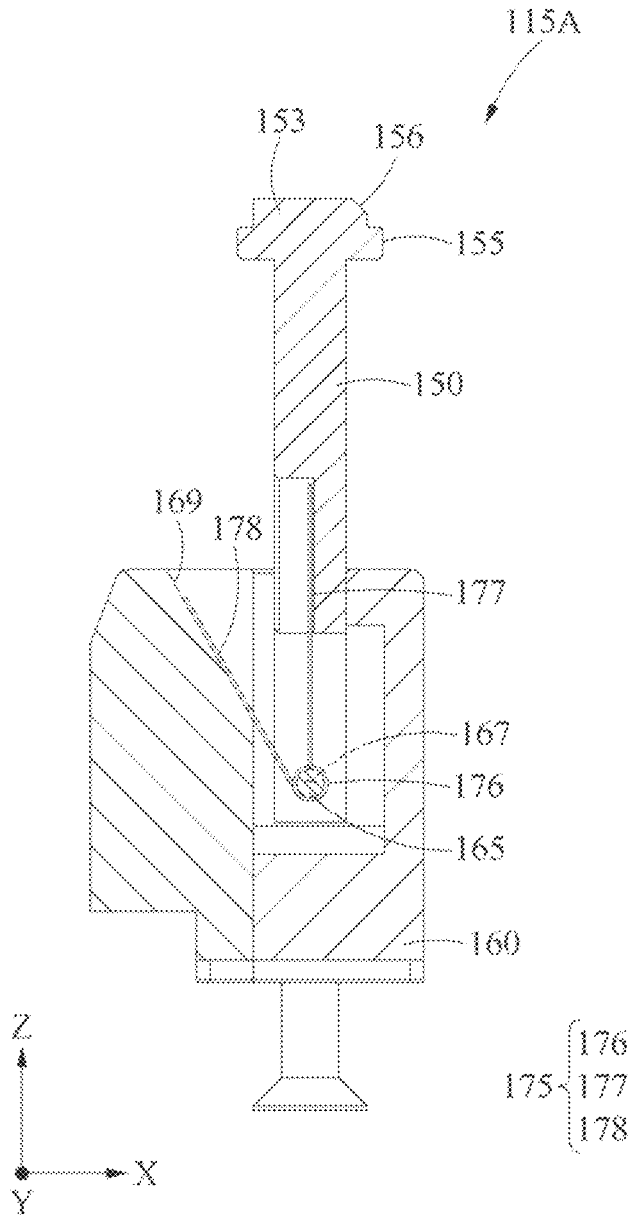
FIG. 8B is a cross-sectional view of a first fixing guide according to one or more embodiments.

FIG. 8A is a perspective view of a first fixing guide 115A, according to one or more embodiments, and FIG. 8B is a cross-sectional view of the first fixing guide 115A, according to one or more embodiments. Specifically, FIG. 8B is a cross-sectional view of the first fixing guide 115A along the B-B' line of FIG. 8A.

Referring to FIGS. 8A and 8B, according to one or more embodiments, the elastic member 175 of the first fixing guide 115A may be positioned to surround at least some areas of the circumference of the shaft member 165.

In one or more embodiments, at least one component or feature of the embodiments described above may be coupled to the first fixing guide 115A of FIGS. 8A and 8B and an apparatus for attaching a protective film (e.g., the apparatus for attaching a protective film FIG. 1 or 3A or 3B, FIGS. 5A to 5E, or FIG. 6A or 6B) including the first fixing guide 115A.

In one or more embodiments, the shaft member 165 may support the guide block

150 such that the guide block 150 may be tilted in a first direction or a second direction. The guide block 150 may tilt the shaft member 165 to the rotation axis R.

In one or more embodiments, the shaft member 165 may be implemented in a protruding structure formed in the guide housing 160 inside the guide housing 160. In addition, the shaft member 165 may be formed in a through-hole structure (e.g., the structure of FIG. 7A) inserted into an opening formed in the guide housing 160. The shaft member 165 in a through-hole structure may be applied substantially equally or similarly to the first fixing guide 115 of FIG. 8A.

In one or more embodiments, the elastic member 175 of the first fixing guide 115A may be positioned to surround at least some areas of the circumference of the shaft member 165. For example, the guide block 150 may include a guide hole 167 formed therethrough in one direction (e.g., a Y-axis direction), and the shaft member 165 and the elastic member 175 may be inserted into the guide hole 167.

In one or more embodiments, the elastic member 175 may include a first area 176, a second area 177, and a third area 178. The first area 176 may be an area surrounding at least some areas of the circumference of the shaft member 165.

In one or more embodiments, the second area 177 may be connected to an end of the first area 176. The second area 177 may be an area fixed to the guide block 150. For example, the second area 177 may be inserted into and penetrate through the inside of the guide block 150.

In one or more embodiments, the third area 178 may be connected to the other end opposite to the second area 177 in the first area 176. The third area 178 may be an area fixed to the guide housing 160. For example, the third area 178 may be supported by an inner circumference surface or an outer circumference surface of the guide housing 160 or may be inserted into and penetrate through the inside of the guide housing 160.

In one or more embodiments, the third area 178 may be seated in a slope 169 of the guide housing 160. The slope 169 of the guide housing 160 may be formed on an inner surface facing the guide block 150 such that the third area 178 of the elastic member 175 may be seated thereon. A distance or a slope between the second area 177 and the third area 178 may be formed through the slope 169, and a distance or an angle between the second area 177 and the third area 178 may be reduced as the guide block 150 is tilted, increasing elastic force.

In one or more embodiments, the elastic member 175 may be implemented as a spring. The first fixing guide 115A may include a plurality of elastic members 175, and the plurality of elastic members 175 may extend along a direction (e.g., the Y-axis direction) in which the shaft member 165 extends. The shape and structure of the elastic member 175 may be implemented variously. For example, two elastic members 175 may provide restoring force to the guide block 150 by inserting the second area 177 into both sides of the guide block 150.

In one or more embodiments, the elastic member 175 may support tension (e.g., the tension F of FIG. 3B, FIGS. 5A to 5E, or FIG. 6A or 6B) applied to the guide block 150 to a certain level of state (e.g., a state of the apparatus for attaching a protective film 100 of FIG. 5B) by a protective film (e.g., the protective film 50 of FIG. 2, 3A, 3B, or 4, or FIGS. 5A to 5E). As the elastic member 175 supports the guide block 150, the tension F applied to the protective film 50 may increase. The apparatus for attaching a protective film 100 may increase the tension F of the protective film 50 in that section, for example, in a crease area (e.g., the crease area 37 of FIG. 3A or 3B or FIGS. 5A to 5E), and may prevent bubbles or poor attachment of the protective film 50.

In one or more embodiments, if the tension F enters a state (e.g., the state of the apparatus for attaching a protective film 100 of FIG. 5C) exceeding the certain level of state, as the second area 177 and the third area 178 of the elastic member 175 get closer, the guide block 150 may be tilted. The apparatus for attaching a protective film 100 may reduce the tension F applied to the protective film 50 and may prevent the protective film 50 from being deformed or damaged in that section, for example, after the crease area 37.

In one or more embodiments, the first fixing guide 115A may adjust elements, such as a tilting start point, a tilting range, or restoring force of the guide block 150, according to various elements, such as the position of the second area 177 and/or the guide hole 167 formed in the guide block 150, the position of the shaft member 165 fixed to the guide housing 160, the position of the third area 178 and the slope 169 of the guide housing 160, or the type and structure of the elastic member 175. The first guide member of FIGS. 8A and 8B is just an example, and embodiments are not limited thereto.

According to one or more embodiments, the apparatus for attaching a protective film 100 configured to attach the protective film 50 to the surface 35 of the electronic device 30 may include the fixing tray 110 including the seating portion 111 where the electronic device 30 is seated, the rail 123 formed in a first direction, the base 120 to which the fixing tray 110 is coupled, the roller 131 configured to press the surface 35 of the electronic device 30 seated in the fixing tray 110, and the roller module 130 configured to move along the rail 123 in the first direction. In one or more embodiments, the fixing tray 110 may include the first fixing guide 115 protruding from the fixing tray 110 in the first direction from the seating portion 111 to support an end of the protective film 50 and the second fixing guide 117 protruding from the fixing tray 110 in a second direction that is opposite to the first direction from the seating portion 111 to support the other end of the protective film 50. In one or more embodiments, the first fixing guide 115 may include the guide block 150, to which an end of the protective film 50 is fastened, that is tilted based on the rotation axis R by a change in tension applied to the protective film 50 according to the movement of the roller 131, the guide housing 160 accommodating the guide block 150, and the elastic member 170 or 175 that is included in the guide housing 160 and that provides restoring force in the first direction with respect to the movement of the guide block 150.

In one or more embodiments, the guide block 150 may include the first end 151 inside the guide housing 160 and the second end 152 that is opposite to the first end 151 and that extends in a direction away from the guide housing 160.

In one or more embodiments, the guide block 150 may include the head area 153 to which an end of the protective film 50 is fastened and the protruding area 155 that is formed under the head area 153 and that protrudes from at least some areas of the circumference of the guide block 150.

In one or more embodiments, the guide block 150 may include the chamfering surfaces 156 and 157 formed in the first direction at an edge of an end of the head area 153.

In one or more embodiments, the guide block 150 may include the chamfering surface 156 that is at the edge of the end of the head area 153 and that has a substantially bevel shape.

In one or more embodiments, the guide block 150 may include the chamfering surface 157 rounded and at the edge of the end of the head area 153.

In one or more embodiments, the elastic member 170 may be positioned between the guide block 150 and the guide housing 160 in the second direction of the guide block 150.

In one or more embodiments, the first fixing guide 115 may include the plurality of elastic members 170 extending in one direction.

In one or more embodiments, the guide block 150 may include the first accommodating groove 171 into which an end of the elastic member 170 is inserted. In one or more embodiments, the guide housing 160 may include the second accommodating groove 172 into which the other end that is opposite to the end of the elastic member 170 is inserted.

In one or more embodiments, the first fixing guide 115 may include the shaft member 165 supporting the guide block 150 such that the guide block 150 is tilted in the first direction or the second direction.

In one or more embodiments, the elastic member 175 of the first fixing guide 115 may be positioned to surround at least some areas of the circumference of the shaft member 165.

In one or more embodiments, the elastic member 175 may include the first area 176 surrounding the at least some areas of the circumference of the shaft member 165, the second area 177 connected to an end of the first area 176 and fixed to the guide block 150 and the third area 178 connected to the other end that is opposite to the second area 177 in the first area 176 and fixed to the guide housing 160.

In one or more embodiments, the guide housing 160 may include the slope 169 formed on an inner surface facing the guide block 150 such that the third area 178 of the elastic member 175 is seated.

In one or more embodiments, the first fixing guide 115 may be tilted in a range of 15 to 25 degrees in the second direction from a direction perpendicular to the surface 35 of the electronic device 30 as the roller module 130 moves in the first direction.

In one or more embodiments, the first fixing guide 115 may protrude in a position higher than that of the second fixing guide 117 from the fixing tray 110.

According to one or more embodiments, the apparatus for attaching a protective film 100 configured to attach the protective film 50 to the surface 35 of the electronic device 30 may include the fixing tray 110 including the seating portion 111 where the electronic device 30 is seated, the rail 123 formed in a first direction, the base 120 to which the fixing tray 110 is coupled, the roller 131 configured to press the surface 35 of the electronic device 30 seated in the fixing tray 110, and the roller module 130 configured to move along the rail 123 in the first direction. In one or more embodiments, the fixing tray 110 may include the first fixing guide 115 protruding from the fixing tray 110 in the first direction from the seating portion 111 to support an end of the protective film 50 and the second fixing guide 117 protruding from the fixing tray 110 in a second direction that is opposite to the first direction from the seating portion 111 to support the other end of the protective film 50. In one or more embodiments, the first fixing guide 115 may include the guide block 150, to which an end of the protective film 50 is fastened, that is tilted based on the rotation axis R by a change in the tension F applied to the protective film 50 according to the movement of the roller 131, the guide housing 160 accommodating the guide block 150, and the elastic member 170 that is positioned between the guide block 150 and the guide housing 160 in a second direction of the guide block 150 and that provides restoring force in the first direction with respect to the movement of the guide block 150.

In one or more embodiments, the guide block 150 may include the first accommodating groove 171 into which an end of the elastic member 170 is inserted, and the guide housing 160 may include the second accommodating groove 172 into which the other end that is opposite to the end of the elastic member 170 is inserted.

In one or more embodiments, the guide block 150 may include the first end 151 inside the guide housing 160 and the second end 152 that is opposite to the first end 151 and that extends in a direction away from the guide housing 160. In one or more embodiments, the first fixing guide 115 may be relatively adjacent to the first end 151 than the second end 152 and may include the shaft member 165 supporting the guide block 150 such that the guide block 150 is tilted in the first direction or the second direction.

In one or more embodiments, the guide block 150 may include the head area 153 to which an end of the protective film 50 is fastened and the protruding area 155 that is formed under the head area 153 and that protrudes from at least some areas of the circumference of the guide block 150.

In one or more embodiments, the guide block 150 may include the chamfering surfaces 156 and 157 formed in the first direction at an edge of an end of the head area 153.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An apparatus configured to attach a protective film to a surface of an electronic device, the apparatus comprising:
- a fixing tray comprising a seating portion at which the electronic device is seated;
- a base to which the fixing tray is coupled, the base comprising a rail extending in a first direction; and
- a roller module configured to move along the rail in the first direction, the roller module comprising a roller configured to press the surface of the electronic device seated in the fixing tray, wherein the fixing tray comprises:
- a first fixing guide protruding from the fixing tray in the first direction from the seating portion and configured to support a first end of the protective film; and
- a second fixing guide protruding from the fixing tray in a second direction that is opposite to the first direction and configured to support a second end of the protective film, and wherein the first fixing guide comprises:
- a guide block to which the first end of the protective film is fastened, the guide block configured to be tilted about a rotation axis in response to a change in tension applied to the protective film from movement of the roller;
- a guide housing accommodating the guide block; and
- an elastic member in the guide housing and configured to provide a restoring force in the first direction in response to movement of the guide block.

2. The apparatus of claim 1, wherein the guide block comprises:
- a first end inside the guide housing and a second end that is opposite to the first end and extending in a direction away from the guide housing.

3. The apparatus of claim 1, wherein the guide block comprises:
- a head area to which the first end of the protective film is fastened; and
- a protruding area under the head area and protruding from at least a portion of a circumference of the guide block.

4. The apparatus of claim 3, wherein the guide block further comprises:
- chamfering surfaces at an edge of an end of the head area.

5. The apparatus of claim 3, wherein the guide block further comprises:
- a chamfering surface at an edge of an end of the head area and having a bevel shape.

6. The apparatus of claim 3, wherein the guide block further comprises:
- a rounded chamfering surface at an edge of an end of the head area.

7. The apparatus of claim 1, wherein the elastic member is between the guide block and the guide housing in the second direction.

8. The apparatus of claim 7, wherein the first fixing guide further comprises a plurality of elastic members extending in one direction.

9. The apparatus of claim 1, wherein the guide block comprises a first accommodating groove into which a first end of the elastic member is inserted, and
- wherein the guide housing comprises a second accommodating groove into which a second end of the elastic member that is opposite to the first end is inserted.

10. The apparatus of claim 1, wherein the first fixing guide further comprises:
- a shaft member supporting the guide block such that the guide block is tilted in the first direction or the second direction.

11. The apparatus of claim 10, wherein the elastic member surrounds at least a portion of a circumference of the shaft member.

12. The apparatus of claim 10, wherein the elastic member comprises:

a first area surrounding at least a portion of a circumference of the shaft member;

a second area connected to a first end of the first area and fixed to the guide block; and a third area connected to a second end of the first area that is opposite to the second area and fixed to the guide housing.

13. The apparatus of claim 12, wherein the guide housing comprises:

a slope on an inner surface facing the guide block such that the third area of the elastic member is seated in the slope.

14. The apparatus of claim 1, wherein the first fixing guide is configured to be tilted in a range of 15 degrees to 25 degrees in the second direction with respect to a direction perpendicular to the surface of the electronic device as the roller module moves in the first direction.

15. The apparatus of claim 1, wherein the first fixing guide protrudes to a position that is higher than a position of the second fixing guide with respect to the fixing tray.

16. An apparatus configured to attach a protective film to a surface of an electronic device, the apparatus comprising:

a fixing tray comprising a seating portion at which the electronic device is seated;

a base to which the fixing tray is coupled, the base comprising a rail extending in a first direction; and a roller module configured to move along the rail in the first direction, the roller module comprising a roller configured to press the surface of the electronic device seated in the fixing tray, wherein the fixing tray comprises:

a first fixing guide protruding from the fixing tray in the first direction from the seating portion and configured to support a first end of the protective film; and a second fixing guide protruding from the fixing tray in a second direction that is opposite to the first direction and configured to support a second end of the protective film, and wherein the first fixing guide comprises:

a guide block to which the first end of the protective film is fastened, the guide block configured to be tilted about a rotation axis in response to a change in tension applied to the protective film from movement of the roller;

a guide housing accommodating the guide block; and an elastic member between the guide block and the guide housing in the second direction and configured to provide a restoring force in the first direction in response to movement of the guide block.

17. The apparatus of claim 16, wherein the guide block comprises a first accommodating groove into which a first end of the elastic member is inserted, and wherein the guide housing comprises a second accommodating groove into which a second end that is opposite to the first end of the elastic member is inserted.

18. The apparatus of claim 16, wherein the guide block comprises a first end inside the guide housing and a second end that is opposite to the first end and that extends in a direction away from the guide housing, and wherein the first fixing guide is closer to the first end than the second end and comprises a shaft member supporting the guide block such that the guide block is configured to tilt in the first direction or the second direction.

19. The apparatus of claim 16, wherein the guide block comprises:

a head area to which the first end of the protective film is fastened; and a protruding area under the head area and protruding from at least a portion of a circumference of the guide block.

20. The apparatus of claim 19, wherein the guide block further comprises:

chamfering surfaces at an edge of an end of the head area.

* * * * *